(12) United States Patent
Fricke et al.

(10) Patent No.: US 6,227,759 B1
(45) Date of Patent: *May 8, 2001

(54) CONTINUOUS WELDED-JOINT SURFACE FOR SKATING

(75) Inventors: Leonard S. Fricke; Carl W. Sims, both of St. Paul, MN (US)

(73) Assignee: TecLink International Ltd., St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,450

(22) Filed: Sep. 24, 1997

Related U.S. Application Data

(60) Provisional application No. 60/026,690, filed on Sep. 25, 1996.

(51) Int. Cl.$^7$ .......................................................... E04C 2/00
(52) U.S. Cl. ............................. 404/28; 404/35; 52/391.1
(58) Field of Search ............................... 404/28, 29, 32, 404/34, 35, 36, 44, 40; 52/390, 391.1; 108/51.1; 272/70; 428/109

(56) References Cited

U.S. PATENT DOCUMENTS

| | | | |
|---|---|---|---|
| 2,469,021 | * 5/1949 | Vetter | 472/90 |
| 3,497,211 | * 2/1970 | Nagin | 472/88 |
| 3,771,891 | * 11/1973 | Nirenski et al. | 404/40 |
| 4,022,437 | * 5/1977 | French | 472/88 |
| 4,169,688 | * 10/1979 | Toshio | 404/40 |
| 4,392,647 | * 7/1983 | Golebieski | 472/90 |
| 4,467,728 | * 8/1984 | Horne | 108/51.1 |
| 4,497,483 | * 2/1985 | Ahlgren | 472/88 |
| 4,694,627 | * 9/1987 | Omholt | 52/390 |
| 5,076,571 | * 12/1991 | Croce, Jr. et al. | 272/70 |
| 5,356,135 | * 10/1994 | Montgomery | 273/57 |
| 5,837,343 | * 11/1998 | Park et al. | 428/109 |

OTHER PUBLICATIONS

Brochure: Scoreboard—Skate On vs. Ice / Gene Plattner, President of Skate On, Inc. The Skate On Story.
Brochure: American Super Ice International, Inc.—Super Ice—Ice That Never Melts; A High–Tech Synthetic Plastic for "Ice" Skating.
Brochure: Viking Ice Throughout the World—Allan A. Weir, President of Viking Ice, Inc. What Is It and How Does It Work?

* cited by examiner

Primary Examiner—Eileen D. Lillie
Assistant Examiner—Raymond W Addie
(74) Attorney, Agent, or Firm—Nikolai Mersereau & Dietz, P.A.

(57) ABSTRACT

A plastic skating surface comprising at least two sheets of plastic welded together. The plurality of welded sheets of plastic form a continuous skating surface, wherein the effects of expansion and contraction due to temperature change is limited to the outer perimeter of the skating surface. An expansion plate overlaps the outer perimeter of the skating surface, thereby defining a fixed enclosure of the skating surface.

18 Claims, 4 Drawing Sheets

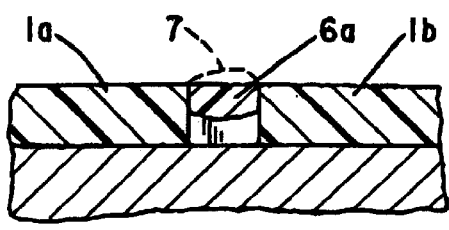
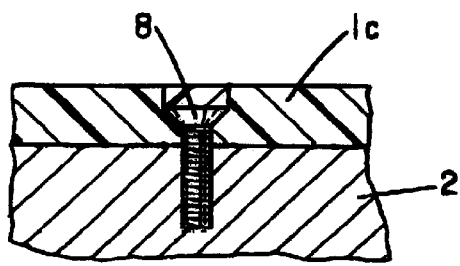
FIG. 3
FIG. 4

CONTINUOUS WELDED-JOINT SURFACE FOR SKATING

This nonprovisional application claims priority based upon a prior U.S. Provisional Patent Application entitled "Continuous Welded-Joint Surface For Skating", Ser. No. 60/026,690, filed Sep. 25, 1996.

BACKGROUND OF THE INVENTION

I. Field of the Invention

The present invention relates generally to a skating surface, and more particularly relates to a plastic skating surface, wherein the skating surface comprises at least two sheets of plastic welded together. The effects of expansion and contraction of the skating surface is limited to the outer perimeter of the skating surface. An expansion plate overlaps the outer perimeter of the skating surface, thereby defining a fixed outer edge of the skating surface.

II. Discussion of the Related Art

Plastic has been used for over 20 years as a surface upon which one can skate using either hockey or figure skates. At this time such products are not generally accepted by the hockey community nor by the figure skating community even though certain individuals have endorsed them or are selling such products. Sales of such products are generally limited to very small surfaces (typically 30–40 feet square) compared to entire hockey rinks (200'×85') or even smaller training areas of perhaps 3,000 to 6,000 square feet. For over 20 years the market has rejected plastic ice as a meaningful competitor or supplement for refrigerated ice.

The basic thermal expansion and contraction properties of plastic have been the major factor in limiting the commercial viability of "plastic ice". Those parties knowledgeable in plastics and their commercial applications understand that plastic products are subject to expansion and contraction in relation to changes in the air temperature around the plastic. For example, HMD (high molecular density) plastic if applied to an entire ice arena 200 feet long would expand and shrink about 2 feet, given a 70–80 degree change in temperature. The present invention involves a strategy for dealing with these scientifically determined characteristics of plastic. Before the present invention, welding technologies for plastics had not been applied to plastic surfaces for skating and/or hockey playing or training areas.

Those companies making products for skating and/or hockey related purposes have all employed various forms of tongue-and-groove or interlocking designs as their method of locking the plastic in place and in dealing with expansion and contraction. The principle disadvantages of these existing and former products include price, and the expansion and contraction problems associated with the linear coefficients of thermal expansion and contraction for plastics. Price becomes a factor primarily because of the need to have a system that compensates for the above-mentioned expansion and contraction characteristics.

When we started researching this problem, while seeking a low cost surface viable for use in training skaters and hockey players as a supplement to refrigerated ice surfaces, we discovered the existing companies had products with essentially the same characteristics all apparently designed to compensate for expansion and contraction. These surfaces generally employed relatively small (23"×23"to 48"×48") surfaces that were about one inch thick and employed tongue-and-groove methods of attachment. We also observed thinner plastic surfaces of a rectangular nature that also employed tongue-and-groove joints. These surfaces failed due to warping at the perimeter of each piece including the joints, as a result of the natural expansion and contraction from temperature changes.

Installing tongue-and-groove sections is costly because of the time needed to install many pieces. The largest such known product comes in 4'×4' sections. A 60'×100' training area of 6,000 square feet would require about 375 such pieces to be fit together, each piece dependent upon laying other pieces. In contrast, according to the present invention, 25 plastic sheets 30'×8' may be welded together to form a training area having the same square footage. Laying such sections, prior to welding can be done in less than one hour by one crew.

Typically, the tongue and groove plastic skating surface is expensive due to the nature of their design and installation practices. A skating surface made according to the present invention should cost less than one-half the cost of a plywood backed tongue and groove system.

Another product similar to the tongue and groove product is made by bonding 0.25" plastic to 0.5" sheets of high quality plywood. The product is also milled with grooves on all four sides of the plywood core to allow joining by pieces of plastic which fit into the grooves of adjoining pieces. This process of production is also expensive because of the need to bond the ¼ inch plastic on either side of the wood, cut the resulting pieces into squares and then mill the sides to create the grooves. Typically, such products retail at a price in excess of $24.00 a square foot even for full-sized rinks. Hence, a need exist for an economical plastic skating surface that directs the expansion and contraction of the skating surface to an outer edge of the skating surface. The present invention addresses these and other needs.

SUMMARY OF THE INVENTION

The purpose of the present invention is to provide a plurality of plastic sheet material aligned edge to edge in a common plane, wherein the edges of adjacent sheets are welded together to thereby form a single continuous skating surface that directs the expansion and contraction of the skating surface to an outer periphery of the skating surface. Without any limitation intended, the preferred embodiment of the present invention utilizes a high molecular weight (HMW) polyethylene polymer. The HMW polyethylene is used in a plastic injection molding process to produce a molded large sheets of plastic ¼ to ½ inch thick. In the preferred embodiment, the plastic sheets are ⅜ of an inch thick, 32 feet long and 8 feet wide. Those skilled in the art will appreciate that the plastic sheets may be manufactured having dimensions that are either longer or thicker or in any combination thereof.

In the preferred embodiment, the skating surface comprises at least two sheets of plastic laid side by side and welded together thereby forming a single continuous piece of plastic. The single continuous plastic skating surface restricts the effects of expansion/contraction to the perimeter of the surface. The expansion/contraction of the skating surface can be calculated and steps can be taken to accommodate each direction of movement. For example, the manufacture of a 30'×100' training area in accordance with the present invention would involve about 12 sheets of plastic welded together. If temperature fluctuations could be limited to changes of 70–80 degrees (a reasonable assumption for use in insulated buildings) then the overall skating surface would expand about 12 inches along its length and 4 inches along its sides. Hence, when installing the sheets in a confined area, the installation would need to accommodate a 2 inch expansion along each side and a 6 inch expansion at each end. This can easily be done by installing the plastic in such a manner that it either has unoccupied space around all four sizes or has "kick boards" that float slightly above the plastic and extend over the plastic by 2 inches on the sides and 6 inches on the ends. The details of such a kick board will be apparent to those skilled in the art.

If desired, a larger sheet of plastic, such as 17,000 square foot (a standard 200'×85') hockey rink surface, or a much smaller surface, is anchored by a number of commercially available means of "pinning" the sheet in the middle so that its heat-change-induced movement is restricted to a limited area at the parameter of the surface. Pinning the sheet allows for the construction of dasher boards or kick boards (boards used hockey rinks) suspended over the plastic in such a manner as to allow the plastic to expand and contract without either buckling or shrinking outside the confines of the dasher boards.

In other unrelated fields that utilize plastic to form parts, persons knowledgeable with the properties of plastic have for a number of years been able to weld together the plastic parts. Plastics can be welded by using a tack weld to essentially melt the adjoining surfaces together. Plastic surfaces can also be welded together by using a simple device, such as a Seeley plastic welder, an inexpensive welding tool that allows a coil of round plastic to be heated, along with the adjacent plastic surfaces. Then the heated plastic from the coil is drawn through the welder and the two adjacent surfaces are welded together often with minimal contact and with a ridge left from the process. Further, plastic can be welded by a more expensive injection welder which creates more heat and results in the weld going deeper into the space between the two surfaces one wishes to connect.

To the best of our knowledge no entity supplying plastic surfaces has employed a welding process to create a continuous sheet of plastic of sufficient size for skating and/or hockey related purposes in which the principle activities involve skating and/or significant movement on skates.

Welding together plastic sheets can be completed easily at a welding rate of one foot every three minutes and can be accomplished by one worker. The welding can be completed faster by using more workers thus allowing greater flexibility with regard to the construction schedule. In one particular installation and welding of a test rink manufactured in accordance with the present invention comprising approximately 1,792 s.f. (approximately 40'×48'), the seven 8'×32' sheets of plastic were put into place in about 20 minutes by a crew of about 8–10 high school students. Welding took about two hours and part of this time involved testing different welding tools and techniques.

Welding allows the elimination of all but the most insignificant cracks along seams. Traditional products all contain significant cracks and such cracks are subject to movement (enlarging) because of thermal contraction. Elimination of cracks is also important as a safety and playability feature. The first reduces the risk of injury and the second makes for a more playable surface.

The above-mentioned test rink was disassembled in about 20 minutes and removed entirely from the building in less than one hour by the most primitive of processes and an undersized crew. After the above-mentioned test rink was removed, three of the seven sheets were installed at a second location and re-welded as part of continued experimentation with the product.

At times it may become necessary to repair or replace a portion of the skating surface. A portion of the surface area, if needed, can very quickly be removed by merely cutting the weld and lifting out the base sheets. If vandals, for example, were to cut holes (with an axe or electric drill) in the conventional products, the entire tongue and groove section would have to be removed and replaced. Doing so would likely involve removing very large areas of the surface due to the interlocking nature of tongue-and-groove technology. Such a replacement could take days to complete with much loss of product use time and revenue.

The system of this invention allows spot repairs by welding over small holes, or by routing out larger sections, cutting replacement sections and welding them in place. This can be done in a matter of minutes to hours. Further, over time the plastic will wear unevenly. Should a section need to be replaced, this can be done quickly as described above. The inserted sections can be sanded down if necessary, either prior to installation or after, thus eliminating mistakes in thickness or worry that the newly installed piece would be too thin.

The plastic sheets comprising the skating surface of the present invention are relatively easy to cut compared to the other tongue and groove products requiring an additional one-half inch of either wood or plastic. Thus, custom fitting for corners or around support beams would be easy, much less complicated than would be the case with existing products.

OBJECTS

It is accordingly a principal object of the present invention to provide a plastic skating surface, wherein the expansion and contraction of the skating surface is directed to an outer perimeter of the skating surface.

Another object of the present invention is to provide a plurality of plastic sheets welded together to form a singular continuous plastic skating surface.

These and other objects, as well as these and other features and advantages of the present invention will become readily apparent to those skilled in the art from a review of the following detailed description of the preferred embodiment in conjunction with the accompanying claims and drawings in which like numerals in the several views refer to corresponding parts.

DESCRIPTION OF THE DRAWINGS

FIG. 3 is a sectional view taken along line 3—3 in FIG. 2;

FIG. 4 is a sectional view of one of the individual sheets or sections of the surface, anchored to a supporting surface beneath it;

DETAILED DESCRIPTION OF THE PREFERRED EMBODIMENTS

Figure 1:
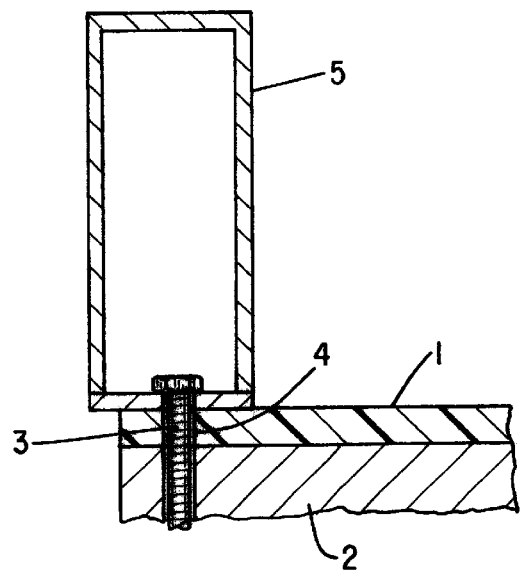
FIG. 1 is a partial sectional view of a continuous welded surface constructed according to the present invention, for use as an ice hockey surface.

FIG. 1 shows part of a rink for ice hockey, incorporating a continuous surface 1 of high molecular weight or very high molecular weight polyethylene, or another suitable material of sufficient strength and weldability. Surface 1 is formed over a supporting surface or floor 2 of concrete, asphalt, plywood or other structural supporting layer. A plurality of bolts 3, extend through openings 4 formed in the surface 1, wherein the bolts are adapted for securing a dasher board system 5 that surrounds the rink. Openings 4 are sufficiently large compared to the bolt diameters and the dasher board system is supported near but above surface 1, to accommodate expansions and contractions of surface 1, mainly in the horizontal direction, responsive to changes in temperature.

Figure 2:
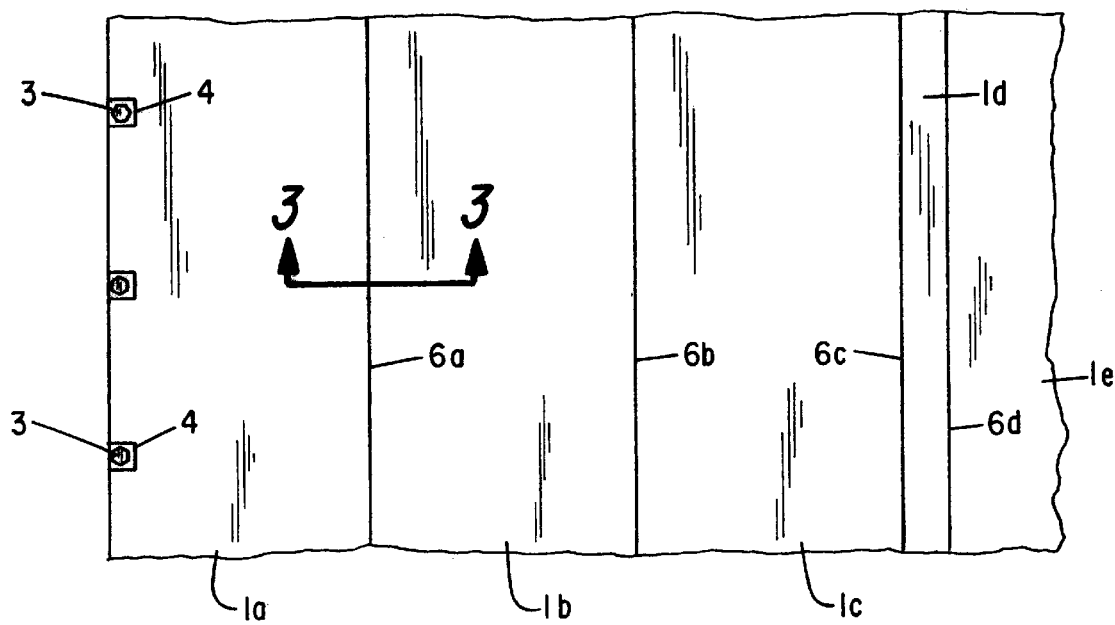
FIG. 2 is a top view of a portion of the surface in FIG. 1.

FIG. 2 shows several openings 4 surrounding bolts 3, and also shows continuous surface 1 made of several individual sheets or sections, some of which are shown as 1a–1e. A weld is formed in a straight line between adjacent sections, for example as shown at 6a–6d. Although these welds are shown as linear, curved or otherwise irregular welds can join sections with non-linear edges.

Weld lines 6c and 6d are shown in much closer proximity than the other weld lines, indicating a much narrower sheet or section 1d. The narrower section 1d is intentional and is pigmented with the color blue to provide one of the "blue lines" used in competitive ice hockey. Other areas, e.g. the crease around the hockey goal, can also be installed in this manner. As compared to merely painting such features, the installation shown is more permanent and durable. Of course, decorative features such as team names and logos could be installed in similar fashion.

FIG. 3 shows weld 6a in greater detail. While the space between surface sections 1a and 1b is exaggerated for illustrative purposes, in practice adjacent sections substantially abut one another along the lines to be welded. A welding tool can apply a heated plastic coil along the weld line, or injection welding can be used. Injection welding provides a weld that extends deeper into the area between adjacent sections. This provides more strength, but also increases the difficulty of disassembling the surface, since disassembly involves cutting the welds between adjacent sections.

Regardless of the welding technique, the welding step typically leaves a slight rise above the remainder of the surface 1, as indicated by the broken lines at 7. This feature is readily removed by planing, sanding or both. In general, the welds are useful primarily to provide surface continuity, rather than for "holding" the adjacent surface panels or sections together. The individual sections tend to remain in place due to their weight, and any horizontal movement is almost entirely because of thermal expansion and contraction.

FIG. 4 illustrates one way movement of the sheets due to thermal expansion can be controlled. In particular, one or more pins 8 can secure a centrally located section such as section 1c directly to the base 2 beneath it. In practice, pin 8 is countersunk in an opening that extends through the section 1c with a diameter about equal to a shank of the pin and a larger diameter opening that accommodates the head of the pin but extends through the section from the top, only far enough to position the pin below the upper surface of section 1c. After the pin is installed, a weld is formed above it to restore the continuous polyethylene surface.

Figure 5:
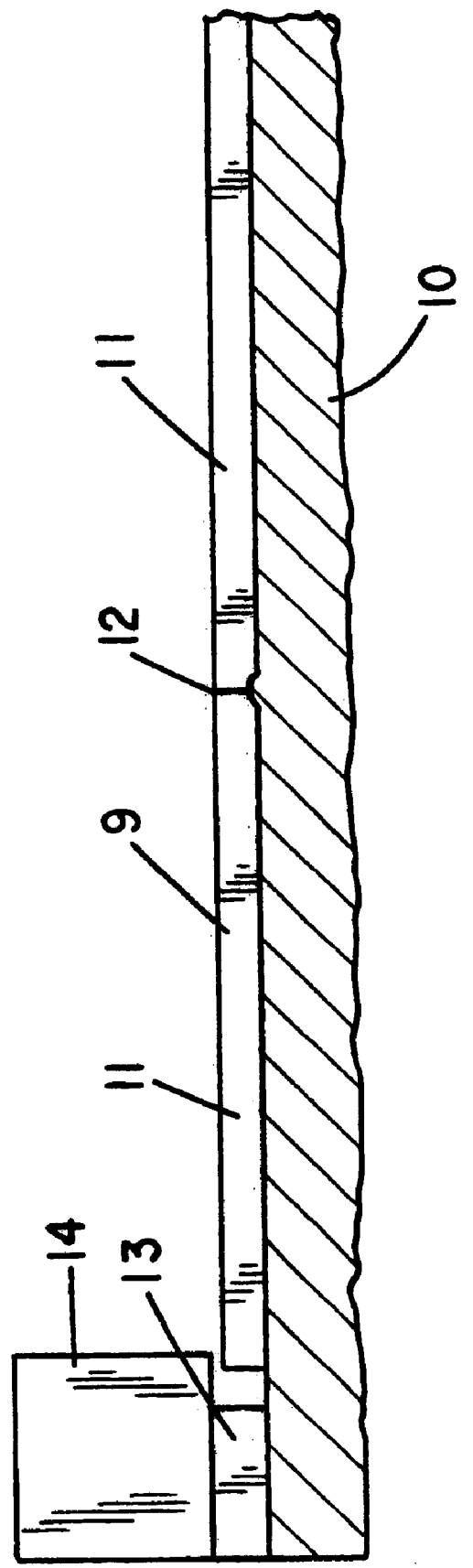
FIG. 5 illustrates a practice area constructed to include a continuous surface according to another embodiment of the present invention.

FIG. 5 shows a continuous surface 9 comprising individual panels or sections 11, joined by welds as indicated at 12. The continuous surface is shown supported by a supporting surface 10. A barrier plate 13 is installed around and spaced apart from the perimeter of surface 9. The spacing is to accommodate thermal expansion of the surface. Installed immediately above barrier plate 13 is an expansion plate 14, which can be wood, metal or plastic. Expansion plate 14 extends inwardly, with its bottom just slightly above the top of surface 9.

Figure 6:
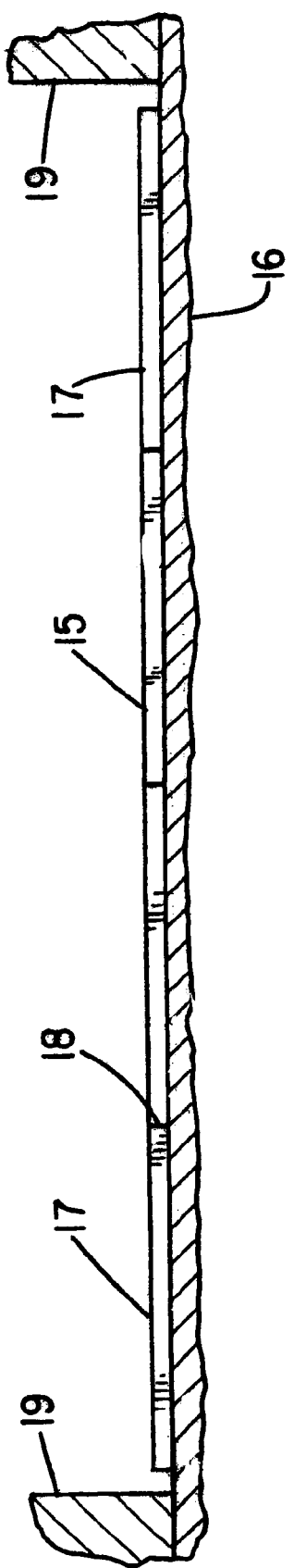
FIG. 6 illustrates another practice area incorporating a continuous surface according to a further embodiment of the present invention.

FIG. 6 shows a continuous surface 15 formed on a support flooring 16. Individual panels 17 are joined by welds 18. There is no base plate or expansion plate. Surface 15 simply is installed with its perimeter spaced apart from a wall 19 as shown, to allow for thermal expansion.

Installation of the continuous skating surface spaced apart from a wall is recommended for more controlled exercises and drills, e.g. stick handling and puck shooting in connection with ice hockey, or figure skating exercises. For other drills and competitive situations, the approaches in FIGS. 1 and 5 are recommended, since use of an expansion plate 14 eliminates the possibility of injury or damage to skates (especially the blades) and other equipment, due to accidental or unintended encounters with the gap between surface 15 and wall 19.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. A plastic skating surface comprising first and second sheets of relatively planar sheet material suitable for use as a skating surface, said first and second sheets being aligned side by side and the skating surface supported but unattached to a supporting surface, wherein a first edge of said first sheet is bonded to a second edge of said second sheet thereby forming a continuous joint between the first and second sheets, at least a portion of a perimeter edge of the joined sheets being at least partially surrounded by an upwardly extending enclosure, wherein a bottom portion of said upwardly extending enclosure overlaps the portion of the perimeter edge of the joined sheets, forming a gap between the portion of the perimeter edge of the joined sheets and the enclosure to allow for expansion and contraction of the joined sheets without a major portion of the perimeter edge contacting the enclosure.

2. The skating surface as recited in claim 1, wherein said sheet material is manufactured from a high molecular weight polyethylene.

3. The skating surface as recited in claim 2, wherein said bond comprises a plastic weld.

4. The skating surface as recited in claim 1, further comprising additional sheets of sheet material having at least one edge of each additional sheet bonded to at least one of the first and second sheets.

5. The skating surface as recited in claim 1, wherein a perimeter edge of the skating surface is surrounded by said enclosure, wherein said enclosure extends upward from the supporting surface.

6. The skating surface as recited in claim 5, wherein a gap is formed between the perimeter edge of the skating surface and a lower edge of the enclosure.

7. The skating surface as recited in claim 4, wherein said sheet material is manufactured from a high molecular weight polyethylene.

8. The skating surface as recited in claim 7, wherein said bond comprises a plastic weld.

9. The skating surface as recited in claim 5, wherein said sheet material is manufactured from a high molecular weight polyethylene.

10. The skating surface as recited in claim 9, wherein said bond comprises a plastic weld.

11. A plastic skating surface comprising first and second sheets of relatively planar sheet material suitable for use as a skating surface, said first and second sheets being aligned side by side, a first edge of said first sheet being bonded to a second edge of said second sheet thereby forming a continuous joint between the first and second sheets, a perimeter edge of the joined sheets being surrounded by an upwardly extending enclosure, wherein a bottom portion of said upwardly extending enclosure overlaps the perimeter edge of the joined sheets, wherein a gap is formed between the perimeter edge of the joined sheets and the enclosure to allow for expansion and contraction of the joined sheets without a major portion of the perimeter edge contacting the enclosure.

12. The skating surface as recited in claim 11, wherein said first and second sheets are supported but unattached to a supporting surface.

13. The skating surface as recited in claim 11, wherein said sheet material is manufactured from a high molecular weight polyethylene.

14. The skating surface as recited in claim 13, wherein said bond comprises a plastic weld.

15. The skating surface as recited in claim 11, further comprising additional sheets of sheet material bonded together to form an enlarged skating surface.

16. A plastic skating surface comprising first and second sheets of relatively planar sheet material suitable for use as a skating surface, said first and second sheets being aligned side by side, said first and second sheets being supported but unattached to a supporting surface, a first edge of said first sheet being bonded to a second edge of said second sheet thereby forming a continuous joint between the first and second sheets, a perimeter edge of the joined sheets being surrounded by an upwardly extending enclosure, wherein a bottom portion of said upwardly extending enclosure overlaps the perimeter edge of the joined sheets, wherein a gap is formed between the perimeter edge of the joined sheets and the enclosure to allow for lateral expansion and contraction of the joined sheets without a major portion of the perimeter edge contacting the enclosure.

17. The skating surface as recited in claim 16, wherein said sheet material is manufactured from a high molecular weight polyethylene.

18. The skating surface as recited in claim 16, further comprising additional sheets of sheet material bonded together to form an enlarged skating surface.

\* \* \* \* \*